(12) United States Patent
Haufe et al.

(10) Patent No.: US 11,254,762 B2
(45) Date of Patent: Feb. 22, 2022

(54) MULTIPLE-COMPONENT COMPOSITION FOR PRODUCING A CORROSION INHIBITING HYDROGEL

(71) Applicant: SIKA TECHNOLOGY AG, Baar (CH)

(72) Inventors: Markus Haufe, Zürich (CH); Max Hug, Zürich (CH); Mirdash Bakalli, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 10 days.

(21) Appl. No.: 16/089,676

(22) PCT Filed: Apr. 13, 2017

(86) PCT No.: PCT/EP2017/059015
§ 371 (c)(1),
(2) Date: Sep. 28, 2018

(87) PCT Pub. No.: WO2017/186517
PCT Pub. Date: Nov. 2, 2017

(65) Prior Publication Data
US 2019/0112398 A1    Apr. 18, 2019

(30) Foreign Application Priority Data

Apr. 27, 2016 (EP) .................................... 16167301

(51) Int. Cl.
| | | |
|---|---|---|
| B05D 1/26 | (2006.01) | |
| C08F 20/18 | (2006.01) | |
| C08K 5/098 | (2006.01) | |
| C08K 5/17 | (2006.01) | |
| C04B 26/06 | (2006.01) | |
| C08F 120/20 | (2006.01) | |
| C09D 5/02 | (2006.01) | |
| C09D 5/08 | (2006.01) | |
| C09D 133/10 | (2006.01) | |
| C04B 111/00 | (2006.01) | |
| C04B 103/61 | (2006.01) | |

(52) U.S. Cl.
CPC .............. *C08F 20/18* (2013.01); *C04B 26/06* (2013.01); *C08F 120/20* (2013.01); *C08K 5/098* (2013.01); *C08K 5/17* (2013.01); *C09D 5/024* (2013.01); *C09D 5/086* (2013.01); *C09D 133/10* (2013.01); *B05D 1/26* (2013.01); *C04B 2103/61* (2013.01); *C04B 2111/00663* (2013.01)

(58) Field of Classification Search
None
See application file for complete search history.

(56) References Cited

U.S. PATENT DOCUMENTS

| | | | |
|---|---|---|---|
| 3,210,207 A * | 10/1965 | Dodson ................... | C04B 28/04 106/728 |
| 5,411,776 A | 5/1995 | Schmidt et al. | |
| 5,916,483 A | 6/1999 | Burge et al. | |
| 6,756,072 B2 | 6/2004 | Baumgart et al. | |
| 8,915,678 B2 | 12/2014 | Boulkertous et al. | |
| 2010/0266348 A1* | 10/2010 | Boulkertous ........... | C04B 28/04 405/270 |
| 2012/0214930 A1 | 8/2012 | Broecher et al. | |
| 2013/0281556 A1* | 10/2013 | Ong ..................... | C04B 40/0039 521/59 |
| 2014/0329947 A1 | 11/2014 | Sahawneh et al. | |
| 2015/0213732 A1 | 7/2015 | Tian et al. | |

FOREIGN PATENT DOCUMENTS

| | | |
|---|---|---|
| CN | 103703098 A | 4/2014 |
| CN | 103819123 A | 5/2014 |
| CN | 104479843 A | 4/2015 |
| EP | 0 635 463 A1 | 1/1995 |
| EP | 3 222 642 A1 | 9/2017 |
| JP | S53-94333 A | 8/1978 |
| JP | S62-34977 | 2/1987 |
| JP | H02-133404 A | 5/1990 |
| JP | H07-173650 A | 7/1995 |
| JP | 2011-523925 A | 8/2011 |
| JP | 2013-75803 A | 4/2013 |
| WO | 00/15353 A1 | 3/2000 |
| WO | 01/74917 A1 | 10/2001 |
| WO | WO-2013140645 A1 * | 9/2013 ............ C09J 133/24 |

OTHER PUBLICATIONS

Jan. 22, 2020 Office Action issued in Chilean Patent Application No. 201802670.
Aug. 12, 2019 Office Action issued in Chilean Patent Application No. 201802670.
Jan. 16, 2019 Office Action issued in The Arab States of The Gulf Patent Application No. GC 2017-33050.
May 15, 2017 Search Report issued in International Patent Application No. PCT/EP2017/059015.
May 15, 2017 Written Opinion issued in International Patent Application No. PCT/EP2017/059015.
Dec. 4, 2019 Written Opinion issued in Singapore Patent Application No. 11201807536W.
Feb. 27, 2020 Office Action issued in Colombian Application No. NC2018/0012653.
Jun. 18, 2020 Office Action issued in European Application No. 17 717 191.5.

\* cited by examiner

*Primary Examiner* — Jose I Hernandez-Kenney
(74) *Attorney, Agent, or Firm* — Oliff PLC

(57) ABSTRACT

A multiple-component composition that can be used for producing a corrosion inhibiting (meth)acrylic hydrogel. The multiple-component composition including at least one water soluble (meth)acrylic compound, at least one free radical initiator, at least one benzoate, and optionally at least one catalyst for free radical formation. A method for producing a hydrogel, to a hydrogel obtainable by the method, to a (meth)acrylic injection material, and to a method for sealing cracks, voids, flaws and cavities in building structures.

24 Claims, No Drawings

MULTIPLE-COMPONENT COMPOSITION FOR PRODUCING A CORROSION INHIBITING HYDROGEL

TECHNICAL FIELD

The invention relates to multiple-component compositions for producing hydrogels and to injection materials, which are used for sealing and filling cracks, voids, flaws, and cavities in concrete structures, in particular in construction industry.

BACKGROUND OF THE INVENTION

Swellable sealants such as poly(meth)acrylate based hydrogels are commonly used in the construction industry for sealing and filling cracks, voids, flaws, and cavities in concrete structures. These sealants are produced by polymerizing water-soluble (meth)acrylate monomers and/or pre-polymers in aqueous solutions to obtain hydrophilic polymers, which are usually crosslinked to improve the stability of the produced hydrogel. The hydrogel forming solutions are typically injected to concrete structure, wherein they form hydrogels within the gelling time of the composition.

Compared to the cementitious sealants, the poly(meth)acrylate based hydrogels have the advantage of easily adjustable open times and ability to absorb movements within the filled body up to a certain extent without damages. As water based systems the poly(meth)acrylates are also less problematic from the ecological point of view compared e.g. polyurethane sealants containing free isocyanates. However, state-of the art sealants based on poly(meth)acrylates contain corrosion promoting substances such as persulfates, which in the presence of water can lead to corrosion of the reinforcing steels of concrete structures at their contact points with the sealant. Consequently, the currently available sealing materials based on poly(meth)acrylates cannot be used in Germany for crack injections of steel reinforced concrete.

One example of the attempts to solve the problems related to the low pH of the poly(meth)acrylate based sealants is provided in U.S. Pat. No. 8,915,678 B2, in which the acidity of the (meth)acrylic monomers is said to be compensated by adding a cementitious binder to the composition, which after setting has alkaline properties. One of the disadvantages of the composition disclosed in U.S. Pat. No. 8,915,678 B2 is that the composition comprises two additional components, an aqueous plastic dispersion and a cementitious binder, in addition to the (meth)acrylate monomers and the free radical initiator. During the application of the injection material, the non-set cementitious binder has to be intimately mixed within the monomers in order to form mixed phases of organic polymer and inorganic cement after curing. The complexity of the mixing process increases the application costs and the additional components increase the production costs of the injection material.

SUMMARY OF THE INVENTION

The object of the present invention is to provide a multiple-component composition for producing hydrogel, which can be used for sealing and filling of cracks, voids, flaws, and cavities in steel reinforced concrete structures without increased risk of corrosion.

It was surprisingly found that a multiple-component composition according to claim 1 solves the aforementioned problems of the prior art.

The main concept of the invention is that the multiple-component composition comprises, in addition to the typical constituents of a composition for producing hydrogel, at least one benzoate as a corrosion inhibiting agent.

The multiple-component composition of the present invention has the advantage that the hydrogel obtainable from the composition after polymerization fulfils the requirements of the corrosion test according to DIN EN 480-14 standard. In order to fulfill the requirements of the corrosion test the tested material has to show passivating effect once contacted with a reinforcing steel bar, which is used as a test material. In practice this means that no corrosion effects are observed even if the electrochemical reactions are accelerated through a potential difference induced to the steel bar.

In another aspect of the present invention, a method for producing a (meth)acrylic hydrogel, a (meth)acrylic hydrogel obtainable by the method, a (meth)acrylic injection material, and a method for sealing and/or filling of cracks, voids, flaws, and cavities in a building structure, is provided.

DETAILED DESCRIPTION OF THE INVENTION

The term "(meth)acrylic" designates methacrylic or acrylic. Accordingly, (meth)acryloyl designates methacryloyl or acryloyl. A (meth)acryloyl group is also known as (meth)acryl group. A (meth)acrylic compound can have one or more (meth)acryl groups (mono,- di-, tri-etc. functional (meth)acrylic compounds) and it may be a monomer, pre-polymer, an oligomer, or a polymer.

Substance names beginning with "poly" designate substances which formally contain, per molecule, two or more of the functional groups occurring in their names. For instance, a polyol refers to a compound having at least two hydroxyl groups. A polyether refers to a compound having at least two ether groups.

The term "hydrogel" designates a polymeric material that exhibits the ability to swell and retain a significant fraction of water within its structure, but will not dissolve in water. The ability of hydrogels to absorb water arises from hydrophilic functional groups attached to the polymeric backbone, while their resistance to dissolution arises from cross-links between polymer chains. The polymer chains can be cross-linked via covalent bonds (chemical gel) or via non-covalent bonds such as ionic interaction or hydrogen bonds (physical gel).

The term "(meth)acrylic" hydrogel designates hydrogel containing hydrophilic (meth)acrylic polymers as main polymeric material. A (meth)acrylic polymer is a polymer of one or more (meth)acrylic compounds or monomers and optionally one or more co-monomers, which are co-polymerizable with the (meth)acrylic compounds or monomers.

The term "benzoate" designates a group of compounds including salts and esters of benzoic acid.

The term "water-soluble compound", e.g. a water-soluble (meth)acrylic compound, designates compounds having a solubility of at least 5 g/100 g water, at a temperature of 20° C.

The term "room temperature" designates a temperature of 23° C.

The term "gelling time" designates a time frame within a hydrogel is formed once the constituents forming the hydrogel have been mixed with each other.

The term "open time" designates a time period for which the composition can still be processed, such as injected into a crack, after the constituents forming hydrogel have been mixed with each other. The end of the open time is usually associated with such an increase in viscosity of the mixture that processing of the mixture is no longer possible.

The present invention relates in a first aspect of the invention to a multiple-component composition for producing a (meth)acrylic hydrogel comprising constituents:

A multiple-component composition comprising constituents:
- a) at least one water-soluble (meth)acrylic compound,
- b) at least one free radical initiator,
- c) at least one benzoate,
- d) optionally at least one catalyst for free radical formation.

The composition according to the invention is a multiple-component composition. The term "component" designates a part of the composition, which contains one or more constituents of the multiple-component composition. The components of the multiple-component composition are provided as physically separated from each other in order to prevent premature reaction of the constituents. Typically, the components are stored in separate air- and moisture impermeable packages or compartments of a single package and they are mixed together and optionally with other components at the time of use or immediately before the time of use of the composition.

The constituents of the multiple-component composition can in principle be provided in components in any conventional way. It is, however, preferable that the at least the free radical initiator and the catalyst for free radical formation are not present in the same component in order to prevent the premature reaction of these constituents and to provide a storage-stable composition. The term "storage-stable composition" refers here to a composition which, in particular in the absence of moisture, can be kept in a suitable package or facility, such as a drum, a pouch or a cartridge, for example, for a period of several months up to one year or more, without suffering any service-relevant change in the application properties and/or reactivity of the composition.

According to one embodiment, the composition is a two-component composition composed of a first component K1 and a second component K2, wherein the constituents b) and the optional constituent d) are not present in the same component. The components K1 and K2 can be provided in two separate packages or in one package having two chambers that are separated from each other. Suitable two-chamber packaging formats include, e.g., dual cartridges such as twin or coaxial cartridges, multi-chamber poaches or bags with adapters.

According to another embodiment, the composition is a three-component composition composed of a first component K1, a second component K2 and a third component K3, wherein the at least one water-soluble (meth)acrylic compound is present in the first component K1 and the at least one free radical initiator and the at least one catalyst for the free radical formation are present in the second and third components K2 and K3, respectively. The components K1-K3 can be provided in separate packages or in one package having three chambers that are separated from each other According to still another embodiment, the composition is a four-component composition composed of a first component K1, a second component K2, a third component K3, and a fourth component K4 wherein the at least one water-soluble (meth)acrylic compound is present in the first component K1 and the at least one free radical initiator, the at least one catalyst for the free radical formation, and the at least one benzoate are present in the second, third, and fourth components K2, K3, and K4, respectively.

One of the characteristics of the present invention is that the multiple-component composition can be used for producing a (meth)acrylic hydrogel. At the time of use, the components of the multiple-component composition and the constituents contained therein are mixed with each other and with such an amount of water that in the thus resulting mixture, the weight ratio of the total amount of the water-soluble (meth)acrylic compounds to water is in the range of 0.1:1 to 5:1, preferably in the range of 0.1:1 to 3:1. After mixing the constituents with water, a polymerization reaction begins and (meth)acrylic hydrogel is formed within a time period, the length of which depends on the embodiment of the composition.

The water required for producing a (meth)acrylic hydrogel can also be contained in one or several components of the multiple-component composition, in which case the (meth)acrylic hydrogel is produced by mixing the components of the multiple-component composition and the constituents contained therein with each other. It is, however, preferable that at least a significant part of the water needed for producing a (meth)acrylic hydrogel is not contained in the multiple-component composition but it is added to composition when the multiple-component composition is used for producing a hydrogel. Preferably, the content of water is less than 30.0% by weight, more preferably less than 20.0% by weight, most preferably less than 15% by weight, of the multiple-component composition. Since the at least one benzoate may be present in the multiple-component composition dissolved in water, it may be preferable that the content of water is at least 1.0%, more preferably at least 2.5% by weight, most preferably at least 5.0% by weight, of the multiple-component composition.

The at least one water-soluble (meth)acrylic compound may be a monomer, an oligomer or a polymer and it may have e.g. a molecular weight or, if it is an oligomer or polymer with a molecular weight distribution, a weight average molecular weight, of not more than 12000 g/mol, preferably not more than 8000 g/mol and more preferably not more than 4000 g/mol. The weight average molecular weight can be determined by gel permeation chromatography (GPC) with a polystyrene standard.

The at least one (meth)acrylic compound is water-soluble in order to achieve a (meth)acrylic hydrogel upon polymerization. Preferably, the at least one (meth)acrylic compound has a solubility of at least 5 g/100 g water at a temperature of 20° C. Most preferably water and the at least one (meth)acrylic compound are completely soluble in each other, i.e. they form a homogenous phase at any mixing ratio. (Meth)acrylic compounds which are not water-soluble cannot be used as main polymerizable compound for producing a hydrogel since they cause separation of the water from the (meth)acrylic polymer formed. These compounds can be present in the multiple-component, however, preferably only in minor amounts.

The at least one water-soluble (meth)acrylic compound may have one, two or more than two (meth)acryloyl groups. Preferably, the at least one water-soluble (meth)acrylic compound has one, two or three (meth)acryloyl groups.

The multiple-component composition preferably comprises at least one water-soluble (meth)acrylic compound having one (meth)acryloyl group and at least one water-soluble (meth)acrylic compound having two or three (meth)acryloyl groups. Water-soluble (meth)acrylic compounds having four or more (meth)acryloyl groups may be contained in addition, but this is usually not preferred.

Preferably, the content of the at least one (meth)acrylic compound is 60.0-99.0% by weight, more preferably 70.0-99.0% by weight, even more preferably 75.0-99.0% by weight, most preferably 85.0-95.0% by weight, of the multiple-component composition, said proportions being based on the total weight of the multiple-component composition excluding the amount of water that may be present. In case multiple (meth)acrylic compounds are present in the composition, "the content of the at least one (meth)acrylic compound" refers to total content of all (meth)acrylic compounds.

Furthermore, the multiple-component composition according to the present invention comprises at least one benzoate, preferably a water-soluble benzoate. The at least one benzoate may be selected from the group consisting of alkali metal, earth alkali metal, ammonium, amine, and alkanolamine salts of benzoic acid, and mixtures thereof, preferably from the group consisting of alkali metal, earth alkali metal, ammonium, and alkanolamine salts of benzoic acid, and mixtures thereof. The benzoate anion in said salts of benzoic acid can be substituted or unsubstituted benzoate anion, preferably unsubstituted benzoate anion. The at least one benzoate can be present in the multiple-component composition dissolved in a solution, e.g. in an aqueous solution, in which case the benzoate exists in the multiple-component composition as benzoate anion and corresponding cation of said salt of benzoic acid.

Suitable alkali metal and earth alkali metal salts of benzoic acid include sodium benzoate, potassium benzoate, calcium benzoate, and magnesium benzoate.

Suitable alkanolamine salts of benzoic acid include primary alkanolamine salts of benzoic acid, secondary alkanolamine salts of benzoic acid, and tertiary alkanolamine salts of benzoic acid. Particularly suitable alkanolamine salts of benzoic acid include ethanolamine, diethanolamine, triethanolamine, propanolamine, dipropanolamine, tripropanolamine, isopropanolamine, di-isopropanolamine, N-methyldi-isopropanolamine, and tri-isopropanolamine salts of benzoic acid.

Preferably, the multiple-component composition comprises at least one benzoate selected from the group consisting of sodium benzoate, potassium benzoate, calcium benzoate, magnesium benzoate, and mixtures thereof, more preferably from the group consisting of sodium benzoate, potassium benzoate, benzoate anion, and mixtures thereof.

The content of the at least one benzoate is preferably 0.05-15.0% by weight, preferably 0.5-10.0% by weight, more preferably 2.0-10.0% by weight, most preferably 5.0-10.0% by weight, of the multiple-component composition, said proportions being based on the total weight of the multiple-component composition excluding the amount of water that may be present. If multiple benzoates are present in the composition, "the content of the at least one benzoate" refers to total content of all benzoates.

The at least one water-soluble (meth)acrylic compound is preferably selected from the group consisting of hydroxyl-functional (meth)acrylates, carboxyl-functional (meth)acrylic compounds, salts of carboxyl-functional (meth)acrylic compounds, polyether (meth)acrylates, (meth)acrylamides, (meth)acrylates having a sulfonic acid group, (meth)acrylamides having a sulfonic acid group, salts or esters of (meth)acrylates having a sulfonic acid group, salts of (meth)acrylamides having a sulfonic acid group, (meth)acrylates having a quaternary nitrogen containing group, (meth)acrylamides having a quaternary nitrogen containing group, and mixtures thereof.

A hydroxyl-functional (meth)acrylate is a (meth)acrylate having one or more hydroxyl groups. Examples of suitable water-soluble hydroxyl-functional (meth)acrylates are hydroxyethylmethacrylate (HEMA), hydroxyethylacrylate (HEA), hydroxypropylmethacrylate (HPMA), hydroxypropylacrylate (HPA), hydroxybutylmethacrylate (HBMA) and hydroxybutylacrylate (HBA).

A carboxyl-functional (meth)acrylic compound is a (meth)acrylic compound having one or more carboxylic groups such as e.g. (meth)acrylic acids or (meth)acrylic acids having one or more additional carboxylic groups. Examples of suitable carboxyl-functional water-soluble (meth)acrylic compounds and anhydrides thereof are methacrylic acid, methacrylic acid anhydride, acrylic acid, acrylic acid anhydride, adducts of hydroxyethylmethacrylate with anhydrides, itaconic acid, maleic acid, maleic anhydride, adduct of maleic anhydride, and succinic acid anhydride.

The cation for said salts of carboxyl-functional (meth)acrylic compounds may be any common cation used in such compounds. Examples of suitable salts are metal salts, in particular alkali metal salts or earth alkaline metal salts, such as sodium salts, potassium salts or magnesium salts, or ammonium salts. Examples of suitable salts of carboxyl-functional (meth)acrylic compounds are salts of (meth)acrylic acids such as sodium acrylate, sodium methacrylate, potassium acrylate, potassium methacrylate, magnesium diacrylate and magnesium dimethacrylate.

Polyether (meth)acrylates are polyethers having one, two, three or more (meth)acrylate groups, respectively, preferably at the terminal ends thereof, wherein the polyether is preferably a polyethylene glycol (PEG), a methoxy polyethylene glycol (MPEG), a polyethylene glycol polypropylene glycol (PEG/PPG) copolymer, in particular block copolymer, an ethoxylated trimethylolpropane or an ethoxylated pentaerythritol. When the polyether is a PEG/PPG copolymer or blockcopolymer, respectively, the amount of PEG therein is preferably at least 30% by weight, in order to achieve suitable water solubility. The polyether (meth)acrylate is preferably a polyether having one (meth)acrylate group or a polyether di(meth)acrylate.

Polyether (meth)acrylates and polyether di(meth)acrylates also include polyethers having one or two (meth)acrylate groups, respectively, wherein the polyether includes further structural units such as urethane groups, e.g. oligomers or prepolymers obtained by reaction of polyetherpolyols, in particular polyetherdiols, or polyethermonools with compounds having two functional groups which are reactive to hydroxyl groups such as polyisocyanates. For instance, polyether (meth)acrylates and polyether di(meth)acrylates may be obtained by reaction of polyetherpolyols or polyethermonools such as PEG, MPEG, PEG-PPG or MPEG-PPG or MPPG-PEG block copolymers, with polyisocyanates to obtain an isocyanate-functional product which is subsequently reacted with a hydroxyl-functional (meth)acrylic compound such as hydroxyethyl methacrylate. With respect to water solubility, also in this case the PEG/PPG blocks preferably have an amount of PEG of at least 30% by weight.

Examples of suitable water-soluble polyether (meth)acrylates and polyether di(meth)acrylates are PEG-di(meth)acrylates such as PEG 200 dimethacrylate, PEG 400 dimethacrylate, PEG 600 dimethacrylate, PEG 2000 dimethacrylate, MPEG-(meth)acrylates such as MPEG 350 (meth)acrylate, MPEG 550 (meth)acrylate, MPEG 1000 (meth)acrylate, and MPEG 2000 (meth)acrylate. Such compounds are commercially available, e.g. from Sartomer, France, e.g. SR252 which is polyethylene glycol (600) dimethacrylate, from Geo Specialty Chemicals, USA, e.g. Bisomer MPEG-350MA, which is methoxy polyethyleneglycol methacrylate.

Examples of suitable ethoxylated trimethylolpropane (meth)acrylates and ethoxylated pentaerythritol (meth)acrylates are an ethoxylated trimethylolpropane tri(meth)acrylate or an ethoxylated pentaerythritol tetra(methacrylate). Such compounds are commercially available, e.g. from Sartomer Americas, USA, e.g. SR415 which is ethoxylated (20) trimethylolpropane triacrylate (20 mole ethoxylated per mole TMP), SR454 which is ethoxylated (3) trimethylolpropane triacrylate (3 mole ethoxylated per mole TMP) or SR494 which is ethoxylated (4) pentaerythritol tetraacrylate (4 mole ethoxylated per mole PE).

The multiple-component composition may optionally comprise one or more water-soluble co-monomers. These co-monomers are co-polymerizable with the acrylic and/or methacrylic compounds or monomers, respectively. In particular, the water-soluble co-monomers have a solubility of at least 5 g/100 g water at 20° C. It goes without saying that the water-soluble co-monomer is different from the acrylic and/or methacrylic compounds. The water-soluble co-monomer is preferably a vinyl compound such as a vinyl ester, a divinyl ester, a vinyl ether or a divinyl ether, preferably a hydroxyl-functional vinyl ether or a hydroxyl-functional divinylether.

The one or more water-soluble co-monomers, if used, are preferably used in relatively low amounts with respect to the water-soluble (meth)acrylic compounds, e.g. in an amount of not more than 15% by weight, preferably not more than 5% by weight, more preferably not more than 1% by weight, said proportions being based on the total weight of water-soluble (meth)acrylic compounds and water-soluble co-monomers contained in the multiple-component composition and excluding all other constituents.

Examples of suitable water-soluble (meth)acrylates or (meth)acrylamides having a sulfonic acid group, and salts or esters thereof are 2-acrylamido-2-methylpropane sulfonic acid (AMPS®) or the sodium salt of 2-acrylamido-2-methylpropane sulfonic acid (Na-AMPS®) and sulfatoethyl methacrylate.

Examples of suitable water-soluble (meth)acrylates and (meth)acrylamides having a quaternary nitrogen containing group are 2-trimethylammoniummethyl methacrylate chloride and 3-trimethylammoniumpropyl methacrylamide chloride.

Preferably the at least one water-soluble (meth)acrylic compound is selected from the group consisting of hydroxyethylmethacrylate (HEMA), hydroxypropylmethacrylate (HPMA), polyethylene glycol dimethacrylate (PEG-DMA), methoxy polyethylene glycol methacrylate (MPEG-MA), ethoxylated trimethylolpropane tri(meth)acrylate (TMP-TMA), maleic acid, itaconic acid, magnesium diacrylate, sodium acrylate, sodium methacrylate, potassium acrylate, potassium methacrylate, potassium salt of 3-sulfopropylacrylat, 2-acrylamido-2-methylpropane sulfonic acid (AMPS®), sodium salt of 2-acrylamido-2-methylpropane sulfonic acid (Na-AMPS®), and mixtures thereof.

According to one embodiment, the at least one water-soluble (meth)acrylic compound is selected from the group consisting of hydroxyethylmethacrylate (HEMA), hydroxypropylmethacrylate (HPMA), polyethylene glycol dimethacrylate (PEG-DMA), methoxy polyethylene glycol methacrylate (MPEG-MA), ethoxylated trimethylolpropane tri(meth)acrylate (TMP-TMA), maleic acid, itaconic acid, magnesium diacrylate, sodium acrylate, sodium methacrylate, potassium acrylate, potassium methacrylate, potassium salt of 3-sulfopropylacrylat, 2-acrylamido-2-methylpropane sulfonic acid (AMPS®), sodium salt of 2-acrylamido-2-methylpropane sulfonic acid (Na-AMPS®), and mixtures thereof, wherein the content of the at least one (meth)acrylic compound is 70.0-99.0% by weight, even more preferably 75.0-99.0% by weight, most preferably 85.0-95.0% by weight, of the multiple-component composition, said proportions being based on the total weight of the multiple-component composition excluding the amount of water that may be present.

The free radical initiator serves to initiate polymerization of the (meth)acrylic compounds. These initiators are known to those skilled in the art. The initiator may be e.g. an organic or inorganic hydroperoxide, an organic or inorganic peroxide such as a peroxydisulfate or persulfate salt, an azo compound, or any other material, which is known to the skilled person for being capable to generate radicals.

The at least one free radical initiator is preferably selected from the group consisting of azobisisobutyronitrile (AIBN), sodium persulfate (NAPS), potassium persulfate, ammoniumpersulfate, hydrogen peroxide, benzoyl peroxide, cumene hydroperoxide, tert-butyl hydroperoxide, diisopropylbenzene hydroperoxide, and mixtures thereof.

Preferably, the content of said at least one free radical initiator is 0.05-5.0% by weight, more preferably 0.1-4.0% by weight, even more preferably 0.1-3.0% by weight, most preferably 0.1-2.0% by weigh, of the multiple component composition, said proportions being based on the total weight of the multiple-component composition excluding the amount of water that may be present. If multiple free radical initiators are present in the composition, "the content of the at least one free radical initiator" refers to total content of all free radical initiators.

The catalyst for free radical formation serves to catalyze the polymerization reaction of the (meth)acrylic compounds. The catalyzing effect of the catalyst may be e.g. based on interaction with the initiator promoting radical generation. These catalysts are known to those skilled in the art. It is preferable that the composition comprises at least one catalyst for free radical formation.

Suitable catalysts for free radical formation include reducing agents, preferably, selected from the group consisting of ascorbic acid, sodium formaldehyde sulfoxylates (SFS) such as Rongalit® (commercially available from BASF), organic sulfinic acid derivatives and salts thereof such as Bruggolite® FF6 and FF7 (commercially available from Bruggeman Chemical), toluidine derivatives, transition metal salts, transition metal complexes, alkylaminoalkyl(meth)acrylamides, alkylaminoalkyl(meth)acrylates, alkanolamines, ethoxylated alkanolamines, inorganic sulfur bearing salts, a reducing sugar such as glucose, and mixtures thereof.

Suitable alkanolamines for use as a catalyst for free radical formation include monoalkanol, dialkanol and trialkanol amines, preferably selected from the group consisting of ethanolamine, dimethylaminoethanol, methylethanolamine, N,N-diethylethanolamine, 2-amino-2-methylpropanol, N-butylethanolamine, N-methyldiisopropanolamine, methyldiethanolamine, diisopropanolamin, diethanolamine, triethanolamine, N-butyldiethanolamine, 2-amino-2-methyl-1,3-propandiol, and mixtures thereof.

Suitable alkylaminoalkyl(meth)acrylamides and alkylaminoalkyl(meth)acrylates for use as a catalyst for free radical formation include dimethylaminopropyl methacrylamide (DMAPMA) and dimethylaminoethyl methacrylate (DMAEMA).

Preferably, the multiple-component composition comprises at least one catalyst for free radical formation selected from the group consisting of diethanolamine, triethanolamine, N-butyldiethanolamine, 2-amino-2-methyl-1,3-propandiol, dimethylaminopropyl methacrylamide (DMAPMA), dimethylaminoethyl methacrylate (DMAEMA), and mixtures thereof.

Preferably, the content of said at least one catalyst for free radical formation is 0.05-7.5% by weight, more preferably 0.1-5.0% by weight, even more preferably 0.1-3.0% by weight, most preferably 0.5-3.0% by weight, of the multiple component composition, said proportions being based on the total weight of the multiple-component composition excluding the amount of water that may be present. If multiple catalysts for free radical formation are present in the composition, "the content of the at least one catalyst for free radical formation" refers to total content of all catalysts for free radical formation.

It has been found out that the amount of benzoates needed to obtain a (meth)acrylic hydrogel fulfilling the requirements of the corrosion test according to DIN 480-14 standard can be reduced by using alkanolamines as secondary corrosion inhibiting agents in the multiple-component composition. The alkanolamines used as secondary corrosion inhibiting agents can also simultaneously catalyze the free radical formation. The alkanolamines may exist in the multiple-component composition in their protonated forms as alkanolamine cations or in their free base forms or partially as alkanolamine cations and partially in free base form.

The multiple-component composition can further comprise at least one alkanolamine different from said at least one catalyst for free radical formation, wherein said at least one alkanolamine is selected from the group consisting of ethanolamine, dimethylaminoethanol, methylethanolamine, N,N-diethylethanolamine, 2-amino-2-methyl-propanol, N-butylethanolamine, N-methyldiisopropanolamine, methyldiethanolamine, diisopropanolamine, diethanolamine, triethanolamine, N-butyldiethanolamine, 2-amino-2-methyl-1,3-propandiol, more preferably from the group consisting of ethanolamine, dimethylaminoethanol, methylethanolamine, N,N-diethylethanolamine, 2-amino-2-methyl-propanol, N-butylethanolamine, N-methyldiisopropanolamine, methyldiethanolamine, diisopropanolamin, and mixtures thereof.

The content of said at least one alkanolamine different from the at least one catalyst for free radical formation is preferably 0.05-10.0% by weight, more preferably 0.5-10.0% by weight, even more preferably 1.0-10.0% by weight, most preferably 2.0-10.0% by weight, of the multiple component composition, said proportions being based on the total weight of the multiple-component composition excluding the amount of water that may be present. The "content of the at least one alkanolamine different from said at least one catalyst for free radical reaction" refers here to the total content of all alkanolamines present in the composition excluding the content of alkanolamines used as catalyst for free radical formation.

The at least one catalyst for the free radical reaction can have a dual functionality as a catalyst for free radical formation and as a secondary corrosion inhibiting agent if used at higher amounts than normally required to catalyze free radical formation reactions. According to one embodiment, the at least one catalyst for free radical reaction is an alkanolamine, wherein the content of said alkanolamine is 0.05-17.5% by weight, preferably 0.1-12.5% by weight, more preferably 2.0-10.0% by weight, most preferably 2.0-7.5% by weight, of the multiple-component composition, said proportions being based on the total weight of the multiple-component composition excluding the amount of water that may be present.

It has been found out that the amount of benzoates needed to obtain a (meth)acrylic hydrogel fulfilling the requirements of the corrosion test according to DIN 480-14 standard can further be reduced by using phosphates as a tertiary corrosion inhibiting agent in the multiple-component composition.

The multiple-component composition can further comprise at least one phosphate, preferably a salt of phosphoric acid, more preferably a water-soluble salt of phosphoric acid. In particular, the at least one phosphate is preferably selected from the group consisting of alkali metal, earth alkali metal, ammonium, and amine salts of phosphoric acid, more preferably from the group consisting of potassium dihydrogen phosphate, dipotassium hydrogen phosphate, potassium phosphate, sodium dihydrogen phosphate, disodium hydrogen phosphate, sodium phosphate and mixtures thereof.

The content of said at least one salt of phosphoric acid is preferably 0.05-10.0% by weight, more preferably 0.1-7.5% by weight, even more preferably 0.1-5.0% by weight, most preferably 0.1-4.0% by weight, of the multiple-component composition, said proportions being based on the total weight of the multiple-component composition excluding the amount of water that may be present. If multiple salts of phosphoric acid are present in the composition, "the content of the at least one salt of phosphoric acid" refers to total content of all salts of phosphoric acid.

According to one embodiment, the multiple-component composition comprises at least one water-soluble (meth)acrylic compound, at least one free radical initiator, at least one catalyst for free radical formation, at least one alkali metal salt of benzoic acid and at least one alkanolamine different from the at least one catalyst for free radical formation, wherein the content of the at least one (meth)acrylic compound is 60.0-99.0% by weight, more preferably 75.0-95.0% by weight, and wherein the content of the at least one alkali metal salt of benzoic acid is 0.05-15.0% by weight, preferably 2.0-10.0% by weight, and wherein the content of the at least one alkanolamine different from the at least one catalyst for free radical formation is 0.05-10.0% by weight, preferably 1.0-10.0% by weight, said proportions being based on the total weight of the multiple-component composition excluding the amount of water that may be present.

According to another embodiment, the multiple-component composition comprises at least one water-soluble (meth)acrylic compound, at least one free radical initiator, at least one catalyst for free radical formation, at least one alkali metal salt of benzoic acid, at least one alkanolamine different from the at least one catalyst for free radical formation, and at least one alkali metal salt of phosphoric acid, wherein the content of the at least one (meth)acrylic compound is 60.0-99.0% by weight, more preferably 75.0-95.0% by weight, and wherein the content of the at least one alkali metal salt of benzoic acid is 0.05-15.0% by weight, preferably 2.0-10.0% by weight, and wherein the content of the at least one alkanolamine different from the at least one catalyst for free radical formation is 0.05-10.0% by weight, preferably 1.0-10.0% by weight, and wherein the content of the at least one alkali metal salt of phosphoric acid is 0.05-10.0% by weight, preferably 0.1-4.0% by weight, said proportions being based on the total weight of the multiple-component composition excluding the amount of water that may be present.

According to another embodiment, the multiple-component composition comprises at least one water-soluble (meth)acrylic compound, at least one free radical initiator, a catalyst for free radical formation, and at least one alkali metal salt of benzoic acid, wherein the catalyst for free radical formation is an alkanolamine, and wherein the content of the at least one (meth)acrylic compound is 60.0-99.0% by weight, more preferably 75.0-95.0% by weight, and wherein the content of said alkanolamine is 0.1-12.5% by weight, preferably 2.0-7.5% by weight, and wherein the content of the at least one alkali metal salt of benzoic acid is 0.05-15.0% by weight, preferably 2.0-10.0% by weight, said proportions being based on the total weight of the multiple-component composition excluding the amount of water that may be present.

According to another embodiment, the multiple-component composition comprises at least one water-soluble (meth)acrylic compound, at least one free radical initiator, a catalyst for free radical formation, at least one alkali metal salt of benzoic acid, and at least one alkali metal salt of phosphoric acid, wherein the catalyst for free radical formation is an alkanolamine, and wherein the content of the at least one (meth)acrylic compound is 60.0-99.0% by weight, more preferably 75.0-95.0% by weight, and wherein the content of said alkanolamine is 0.1-12.5% by weight, preferably 2.0-7.5% by weight, and wherein the content of the at least one alkali metal salt of benzoic acid is 0.05-15.0% by weight, preferably 2.0-10.0% by weight, and wherein the content of the at least one alkali metal salt of phosphoric acid is 0.05-10.0% by weight, preferably 0.1-4.0% by weight, said proportions being based on the total weight of the multiple-component composition excluding the amount of water that may be present.

The multiple-component composition can further comprise at least one filler selected from the group consisting of inert mineral fillers, organic fillers, mineral binders, and mixtures thereof.

The term "filler" refers to solid particulate materials, which typically have a low water-solubility, preferably of less than 0.5 g/100 g water, more preferably less than 0.1 g/100 g water, most preferably less than 0.01 g/100 g water, at a temperature of 20° C.

The chemical nature and particle size of the filler is not specifically limited within the present invention. Preferably, the at least one filler has a particle size $d_{50}$ in the range of 0.1-200.0 μm, more preferably of 0.1-100.0 μm, most preferably 0.1-50.0 μm.

The term median particle size $d_{50}$ refers to a particle size below which 50% of all particles by volume are smaller than the $d_{50}$ value. The term "particle size" refers to the area-equivalent spherical diameter of a particle. The particle size distribution can be measured by laser diffraction according to the method as described in standard ISO 13320-1:2009.

The term "inert mineral filler" refers to mineral fillers that are not chemically reactive. They are produced from natural mineral sources by mining followed by comminution to required particle size and shape. In particular, inert mineral fillers include quartz, ground or precipitated calcium carbonate, crystalline silicas, dolomite, clay, talc, graphite, mica, Wollastonite, barite, diatomaceous earth, and pumice.

The term "organic filler" refers to fillers comprising or consisting of organic materials. In particular, organic fillers include materials comprising or consisting of cellulose, polyethylene, polypropylene, polyamide, polyester, and dispersible polymer compositions or dispersions thereof such as Vinnapas (from Wacker Chemie AG) and Axilat 8510 (from Hexion).

The term "mineral binder" refers to hydraulic, non-hydraulic, latent binders, and pozzolanic binders. In particular, mineral binders include materials comprising or consisting of cement, cement clinker, hydraulic lime, non-hydraulic lime, and gypsum.

Preferably, the content of the at least one filler is 0.0-35.0% by weight, more preferably 1.0-30.0% by weight, most preferably 5.0-25.0% by weight, of the multiple-component composition, said proportions being based on the total weight of the multiple-component composition excluding the amount of water that may be present. If multiple fillers are present in the composition, "the content of the at least one filler" refers to total content of all fillers.

The multiple-component composition may optionally contain inhibitors. Inhibitors are often added to (meth)acrylic compounds, in particular in commercial products, in order to avoid spontaneous polymerization and/or to adjust open times and reaction times, respectively. Examples of suitable inhibitors include butylhydroxytoluene (BTH), hydroquinone (HQ), monomethyl ether hydroquinone (MEHQ), PTZ (phenothiazine), and 4-hydroxy-2,2,6,6-tetramethylpiperidin-1-oxyl (4-hydroxy-TEMPO).

Apart from the above mentioned ingredients, the composition may optionally contain one or more further additives, which are common in this field. Examples are, color dyes and water-soluble diluents such as polyethylene glycol. Color dyes may be suitable to label the mixture.

In another aspect of the present invention, a method for producing a (meth)acrylic hydrogel is provided, the method comprising the steps of:

i) providing a multiple-component composition according the present invention, ii) mixing the constituents of the multiple-component composition with water such that in the thus resulting mixture, the weight ratio of the total amount of said at least one water-soluble (meth)acrylic compound to the amount of water is in the range of 0.1:1 to 5:1, preferably of 0.1:1 to 3:1, iii) letting the mixture form (meth)acrylic hydrogel.

The mixing step ii) is usually carried out by combining the components of the multiple-component composition with water under mixing. Suitable means for mixing are static mixers and dynamic mixers, in particular container-stirrer type mixers such as rotor-stator type mixers, dissolver mixers, colloidal mixers and other high shear mixers. The choice of suitable mixing apparatus depends on the open time of the composition. In case of long open time, the mixing can be conducted with a container equipped with a stirrer whereas in case of short open time, a static mixer is preferably used in mixing.

Preferably, the time needed to complete step iii) is 30 s-240 min, preferably 1-120 min, most preferably 5-90 min.

The viscosity of the mixture at the beginning is usually relatively low, since the mixture is mainly based on water and water-soluble ingredients. The viscosity can be adjusted, e.g. by adjusting the ratio of water to the (meth)acrylic compounds and/or by adjusting the molecular weight of the (meth)acrylic compound(s) and/or by adjusting the type and amount of rheology additives and/or by adjusting the type and amount of fillers, if present in the composition.

The polymerization reaction preferably takes place at ambient temperatures, e.g. at temperatures in the range of −10 to 60° C., more preferably in the range of 0 to 50° C.

In another aspect of the present invention, a (meth)acrylic hydrogel obtainable by the method as described above, is provided.

In still another aspect of the present invention, a (meth) acrylic injection material is provided, which (meth)acrylic injection material is obtainable by mixing the constituents of a multiple-component composition of the present invention with water such that in the thus resulting mixture, the weight ratio of the total amount of the water-soluble (meth)acrylic compounds to water is in the range of 0.1:1 to 5:1, preferably in the range of 0.1:1 to 3:1.

Preferably, the (meth)acrylic injection material has an open time of 30 s-240 min, preferably 1-120 min, most preferably 5-90 min.

The viscosity of the (meth)acrylic injection material, measured with a Brookfield viscometer at temperature of 23° C. with a rotational speed of the viscometer in the range of 150-200 revolutions per minute, is preferably less than 500 mPa·s, more preferably less than 200 mPa·s, most preferably less than 150 mPa·s. Said viscosity of the (meth) acrylic injection material is measured immediately after the complete dissolution of the constituents of the composition in water.

In another aspect of the present invention, a method for sealing and/or filling of cracks, voids, flaws, and cavities in a building structure is provided, the method comprising steps of:

i) providing a multiple-component composition according to the present invention, ii) mixing the constituents contained of the multiple-component composition with water such that the weight ratio of the total amount of said at least one water-soluble (meth)acrylic compound to the amount of water in the mixture is in the range of 0.1:1 to 5:1, preferably of 0.1:1 to 3:1, iii) applying the mixture to the site to be sealed/filled in the building structure and letting the mixture to form (meth) acrylic hydrogel.

The polymerization reaction starts almost immediately upon mixing of the composition and water. Therefore, the step iii) should be started soon after provision of the mixture and in any case within the open time of the mixture.

EXAMPLES

The followings compounds and products, respectively, were used in the examples:

TABLE 1

| | | |
|---|---|---|
| HEMA | Hydroxyethyl methacrylat (HEMA) including 400 ppm hydrochinon monomethylether (HMME) as inhibitor | Visiomer HEMA 98, Evonik Industries |
| NAPS | Sodium persulfate (diluted with water to yield a 20 wt. % solution) | CAS # 7775-27-1 |
| TEA | Triethanolamine (technical grade 85% TEA/15% DEA) | Triethanolamin 85, Ineos Oxide |
| Benzoic acid | Benzoic acid (ACS reagent grade 99.5% benzoic acid) | CAS # 65-85-0 |
| Sodium benzoate | Sodium benzoate | CAS # 532-32-1 |
| Ethanol-amine | Ethanolamine (technical grade 98% ethanol amine) | CAS # 141-43-5 |
| MDIPA | N-Methyldiisopropanolamine | CAS # 4402-30-6 |
| KH2PO4 | Potassium dihydrogen phosphate | CAS # 7778-77-0 |

The example compositions Ex1 to Ex8 were prepared by mixing the ingredients with water to provide hydrogel forming mixtures. The ingredients of the example compositions and their amounts in parts by weight (pbw) are presented in Table 2. The properties of the hydrogels were tested in terms of corrosion properties, gelling time, gel consistency and swelling. These results are also provided in Table 2. The examples ExC6, ExC7, and ExC8 are comparative examples of compositions that did not pass the corrosion test.

Triethanolamine was used as a catalyst for free radical formation in all the examples. The benzoic acid was first reacted with the alkanolamine present in the example compositions as a secondary corrosion inhibitor before it was mixed with the other ingredients.

Corrosion Test

The corrosion properties of the hydrogel materials obtained by polymerization of the example compositions were tested with a potentiostatic electrochemical corrosion test according to the European standard EN 480-14.

For the corrosion test, three cylindrical hydrogel test specimens having a steel working electrode embedded into the hydrogel were prepared from each example composition. The working electrode was arranged centrally in the mold so that the hydrogel covered symmetrically the embedded part of steel electrode.

The cylindrical hydrogel test specimens were prepared by using suitable arrangement of Teflon molds. The constituents of the example compositions were mixed with each until all ingredients were completely dissolved in water and a homogeneous solution was obtained after which the Teflon molds were filled with the thus obtained mixtures. After three hours of reaction time, the cylindrical hydrogel test specimens with embedded working electrodes were removed from the Teflon molds and kept immersed in saturated calcium carbonate solution for 24 hours before the corrosion test.

In the corrosion test, a constant potential of 500 mV versus standard calomel electrode was applied on the steel working electrode and the resulting anodic current flowing between the steel bar and a counter-electrode was monitored for 24 hours. A saturated calcium hydroxide solution at a temperature of 20° C. was used as the electrolyte.

In order to pass the corrosion test according to EN 480-14, the calculated current density with any of the three test specimens should not exceed a value of 10 $\mu A/cm^2$ at any time between 1 hour after the start and 24 hours after the start of the corrosion test. In addition, the recorded current density curve as a function of time has to show a similar trend compared to the current density curve obtained in a similar arrangement with a control specimen (without the tested material). As third criteria, visual inspection of the steel working electrode should not reveal any signs of corrosion. The result of the corrosion test is "passed", if all three criteria are fulfilled. Otherwise the result of corrosion test is "not passed".

Gelling Time (Min)

The gelling time at 23° C. was determined by visual inspection (gel time is achieved at the time when gel-like structures are detected).

Gel Consistency

The gel consistency of the hydrogel obtained was tested haptically.

Swelling 1 Day in Water

For the measurement of the swelling properties, a test specimen with dimensions of 1.0×1.5×1.5 cm was cut from the hydrogel material produced from each of the example compositions. The test specimens were stored in tap water at a temperature of 23° C. and the change in weight of the test specimen was determined at the end of the one day test period. The hydrogel material was cured for 24 hours before conducting the swelling test. The swelling values presented in Table 2 were determined as the percentage change in weight of the test specimen during the swelling test.

TABLE 2

|  | Ex 1 | Ex 2 | Ex 3 | Ex 4 | Ex 5 | Ex 6 | ExC 6 | Ex 7 | ExC 7 | Ex 8 | ExC 8 |
|---|---|---|---|---|---|---|---|---|---|---|---|
| Ingredients |  |  |  |  |  |  |  |  |  |  |  |
| HEMA (pbw) | 40 | 40 | 40 | 40 | 40 | 40 | 40 | 40 | 40 | 40 | 40 |
| TEA (pbw) | 2.5 | 2.5 | 2.5 | 2.5 | 2.5 | 2.5 | 2.5 | 2.5 | 2.5 | 2.5 | 2.5 |
| NAPS (pbw) | 0.1 | 0.1 | 0.1 | 0.1 | 0.1 | 0.25 | 0.25 | 0.25 | 0.25 | 0.25 | 0.25 |
| Benzoic acid (pbw) | 1.83 | 1.22 | 3.66 | 3.66 | 3.66 |  |  |  |  |  |  |
| Sodium benzoate |  |  |  |  |  |  | 4.32 | 2.16 | 2.16 | 2.16 | 2.16 |
| Ethanolamin (pbw) | 0.61 | 1.83 | 0.92 |  |  |  |  |  |  |  |  |
| MDIPA |  |  |  | 4.42 |  |  |  | 2.21 | 0.74 | 0.74 |  |
| $^a$TEA |  |  |  |  | 4.47 |  |  |  |  |  |  |
| $KH_2PO_4$ |  |  |  |  |  |  |  |  |  | 1.36 | 1.36 |
| Water (pbw) | 54.96 | 54.35 | 52.82 | 49.32 | 49.27 | 52.93 | 55.09 | 52.88 | 54.35 | 52.99 | 53.73 |
| Total (pbw) | 100 | 100 | 100 | 100 | 100 | 100 | 100 | 100 | 100 | 100 | 100 |
| Results |  |  |  |  |  |  |  |  |  |  |  |
| $^b$Corrosion test | passed | passed | passed | passed | passed | passed | not passed | passed | not passed | passed | not passed |
| Gelling time at 23° C. (min) | 14 | 10 | 44 | 14 | 12 | 6 | 7 | 6 | 6 | 6 | 10 |
| $^c$Gel consistency | M | M | M | M | M | S | M | M | M | M | M |
| Swelling 1 day in water (%) | 12 | 14 | 9 | 20 | 22 | 30 | 25 | 18 | 30 | 84 | 86 |

$^a$as a secondary corrosion inhibitor
$^b$According to EN DIN 480-14 corrosion test
$^c$S = soft, M = medium

The invention claimed is:

1. A method for producing a (meth)acrylic hydrogel comprising steps of
   i) providing a multiple-component composition comprising constituents:
      a) at least one water-soluble (meth)acrylic compound,
      b) at least one free radical initiator,
      c) at least one benzoate, and
      d) optionally, at least one catalyst for free radical formation,
      wherein the amount of the at least one water-soluble (meth)acrylic compound is 60.0-99.0% by weight, based on the total weight of the multiple-component composition excluding an amount of water that may be present,
      wherein the at least one water-soluble (meth)acrylic compound is selected from the group consisting of hydroxyethylmethacrylate, hydroxypropylmethacrylate, polyethylene glycol dimethacrylate, methoxy polyethylene glycol methacrylate, ethoxylated trimethylolpropane tri(meth)acrylate, maleic acid, itaconic acid, magnesium diacrylate, sodium acrylate, sodium methacrylate, potassium acrylate, potassium methacrylate, potassium salt of 3-sulfopropylacrylate, 2-acrylamido-2-methylpropane sulfonic acid, and sodium salt of 2-acrylamido-2-methylpropane sulfonic acid, and
      wherein the multiple-component composition does not contain an aqueous plastic dispersion,
   ii) mixing the constituents contained in the multiple-component composition with water such that in the thus resulting mixture, the weight ratio of the total amount of said at least one water-soluble (meth)acrylic compound to the amount of water is in the range of 0.1:1 to 5:1,
   iii) letting the mixture form the (meth)acrylic hydrogel.

2. The method according to claim 1, wherein the amount of said at least one water-soluble (meth)acrylic compound is 70.0-99.0% by weight, being based on the total weight of the multiple-component composition excluding the amount of water that may be present.

3. The method according to claim 1, wherein said at least one benzoate is at least one salt of benzoic acid selected from the group consisting of alkali metal, earth alkali metal, ammonium, alkanolamine, and amine salts of benzoic acid.

4. The method according to claim 1, wherein said at least one benzoate is selected from the group consisting of sodium benzoate, potassium benzoate, and mixtures thereof.

5. The method according to claim 1, wherein the amount of said at least one benzoate is 0.05-15.0% by weight, based on the total weight of the multiple-component composition excluding the amount of water that may be present.

6. The method according to claim 1, wherein the amount of said at least one free radical initiator is 0.05-5.0% by weight, based on the total weight of the multiple-component composition excluding the amount of water that may be present.

7. The method according to claim 1, wherein the at least one catalyst for free radical formation is present and is selected from the group consisting of ascorbic acid, sodium formaldehyde sulfoxylates, organic sulfinic acid derivatives and salts thereof, toluidine derivatives, transition metal salts, transition metal complexes, alkylaminoalkyl(meth)acrylamides, alkylaminoalkyl(meth)acrylates, alkanolamines, ethoxylated alkanolamines, inorganic sulfur bearing salts, reducing sugars, and mixtures thereof.

8. The method according to claim 7, wherein the amount of said at least one catalyst for free radical formation is 0.05-7.5% by weight, based on the total weight of the multiple-component composition excluding the amount of water that may be present.

9. The method according to claim 1, wherein the at least one catalyst for free radical formation is present, and the multiple-component composition further comprises at least one alkanolamine selected from the group consisting of monoalkanol, dialkanol, trialkanol amines, and mixtures thereof, wherein said at least one alkanolamine is different from said at least one catalyst for free radical formation.

10. The method according to claim 9, wherein the amount of said at least one alkanolamine different from said at least one catalyst for free radical formation is 0.05-10.0% by weight, based on the total weight of the multiple-component composition excluding the amount of water that may be present.

11. The method according to claim 1, wherein the at least one catalyst for free radical formation is present and is an alkanolamine and wherein the amount of said alkanolamine is 0.05-17.5% by weight, based on the total weight of the multiple-component composition excluding the amount of water that may be present.

12. The method according to claim 1, wherein the multiple-component composition further comprises at least one phosphate in an amount of 0.05-10.0% by weight, based on the total weight of the multiple-component composition excluding the amount of water that may be present.

13. A method for sealing and/or filling of cracks, voids, flaws and cavities in a building structure at a site therein in need of said sealing and/or filling, the method comprising steps of
  (1) providing a multiple-component composition comprising constituents:
    a) at least one water-soluble (meth)acrylic compound,
    b) at least one free radical initiator,
    c) at least one benzoate, and
    d) optionally, at least one catalyst for free radical formation,
  wherein the amount of the at least one water-soluble (meth)acrylic compound is 60.0-99.0% by weight, based on the total weight of the multiple-component composition excluding an amount of water that may be present,
  wherein the at least one water-soluble (meth)acrylic compound is selected from the group consisting of hydroxyethylmethacrylate, hydroxypropylmethacrylate, polyethylene glycol dimethacrylate, methoxy polyethylene glycol methacrylate, ethoxylated trimethylolpropane tri(meth)acrylate, maleic acid, itaconic acid, magnesium diacrylate, sodium acrylate, sodium methacrylate, potassium acrylate, potassium methacrylate, potassium salt of 3-sulfopropylacrylate, 2-acrylamido-2-methylpropane sulfonic acid, and sodium salt of 2-acrylamido-2-methylpropane sulfonic acid, and
  wherein the multiple-component composition does not contain an aqueous plastic dispersion,
  (2) mixing the constituents contained in the multiple-component composition with water such that in the thus resulting mixture, the weight ratio of the total amount of said at least one water-soluble (meth)acrylic compound to the amount of water is in the range of 0.1:1 to 5:1,
  (3) applying the mixture to the site to be sealed/filled in the building structure, and
  (4) letting the mixture form a (meth)acrylic hydrogel.

14. The method according to claim 13, wherein the amount of said at least one water-soluble (meth)acrylic compound is 70.0-99.0% by weight, based on the total weight of the multiple-component composition excluding the amount of water that may be present.

15. The method according to claim 13, wherein said at least one benzoate is at least one salt of benzoic acid selected from the group consisting of alkali metal, earth alkali metal, ammonium, alkanolamine, and amine salts of benzoic acid.

16. The method according to claim 13, wherein said at least one benzoate is selected from the group consisting of sodium benzoate, potassium benzoate, and mixtures thereof.

17. The method according to claim 13, wherein the amount of said at least one benzoate is 0.05-15.0% by weight, based on the total weight of the multiple-component composition excluding the amount of water that may be present.

18. The method according to claim 13, wherein the amount of said at least one free radical initiator is 0.05-5.0% by weight, based on the total weight of the multiple-component composition excluding the amount of water that may be present.

19. The method according to claim 13, wherein the at least one catalyst for free radical formation is present and is selected from the group consisting of ascorbic acid, sodium formaldehyde sulfoxylates, organic sulfinic acid derivatives and salts thereof, toluidine derivatives, transition metal salts, transition metal complexes, alkylaminoalkyl(meth)acrylamides, alkylaminoalkyl(meth)acrylates, alkanolamines, ethoxylated alkanolamines, inorganic sulfur bearing salts, reducing sugars, and mixtures thereof.

20. The method according to claim 19, wherein the amount of said at least one catalyst for free radical formation is 0.05-7.5% by weight, based on the total weight of the multiple-component composition excluding the amount of water that may be present.

21. The method according to claim 13, wherein the at least one catalyst for free radical formation is present, and the multiple-component composition further comprises at least one alkanolamine selected from the group consisting of monoalkanol, dialkanol, trialkanol amines, and mixtures thereof, wherein said at least one alkanolamine is different from said at least one catalyst for free radical formation.

22. The method according to claim 21, wherein the amount of said at least one alkanolamine different from said at least one catalyst for free radical formation is 0.05-10.0% by weight, based on the total weight of the multiple-component composition excluding the amount of water that may be present.

23. The method according to claim 13, wherein the at least one catalyst for free radical formation is present and is an alkanolamine and wherein the amount of said alkanolamine is 0.05-17.5% by weight, based on the total weight of the multiple-component composition excluding the amount of water that may be present.

24. The method according to claim 13, wherein the multiple-component composition further comprises at least one phosphate in an amount of 0.05-10.0% by weight, based on the total weight of the multiple-component composition excluding the amount of water that may be present.

* * * * *